United States Patent

[11] 3,568,191

[72] Inventors James C. Hiester
 Baltimore, Md.;
 Harry L. Van Trees, Jr., Watertown, Mass.
[21] Appl. No. 076,082
[22] Filed Dec. 15, 1960
[45] Patented Mar. 2, 1971
[73] Assignee the United States of America as represented by the Secretary of the Navy

[54] METHOD FOR DEFENDING AN AIRCRAFT AGAINST A FRONTAL ATTACK
 1 Claim, 2 Drawing Figs.
[52] U.S. Cl. .................................................. 343/18
[51] Int. Cl. ............................................. H01q 15/20
[50] Field of Search ........................................ 343/18;
 35/25 (Cursory); 343/18 (B), 18 (C), 18 (E)

[56] References Cited
UNITED STATES PATENTS
2,490,793 12/1949 Fleming ......................... 343/18B
2,763,002 9/1956 Fitzgerald et al. .............. 343/18B
2,957,417 10/1960 Musgrave ....................... 343/18X FOREIGN PATENTS
746,300 3/1956 Great Britain ................. 343/18C
834,596 5/1960 Great Britain ................. 343/18B OTHER REFERENCES
Aviation Week; Nov. 18, 1957; pages 50, 51, 53, 57 and 59; Nov. 25, 1957; pages 105 and 106; Copy in Scientific Library 343-18

Primary Examiner—Rodney D. Bennett, Jr.
Assistant Examiner—Malcolm F. Hubler
Attorneys—W. O. Quesenberry, N. H. Losche and P. S. Collignon CLAIM: A method for defending an aircraft against a frontal attack by an interceptor comprising, launching a rocket in the direction of travel of said aircraft, said rocket containing in a collapsed condition a collapsible reflector having three orthogonal surfaces of wire mesh, then ejecting said reflector from said rocket whereupon said reflector is expanded, and then towing said reflector whereby said reflector serves as a target for attracting said interceptor.

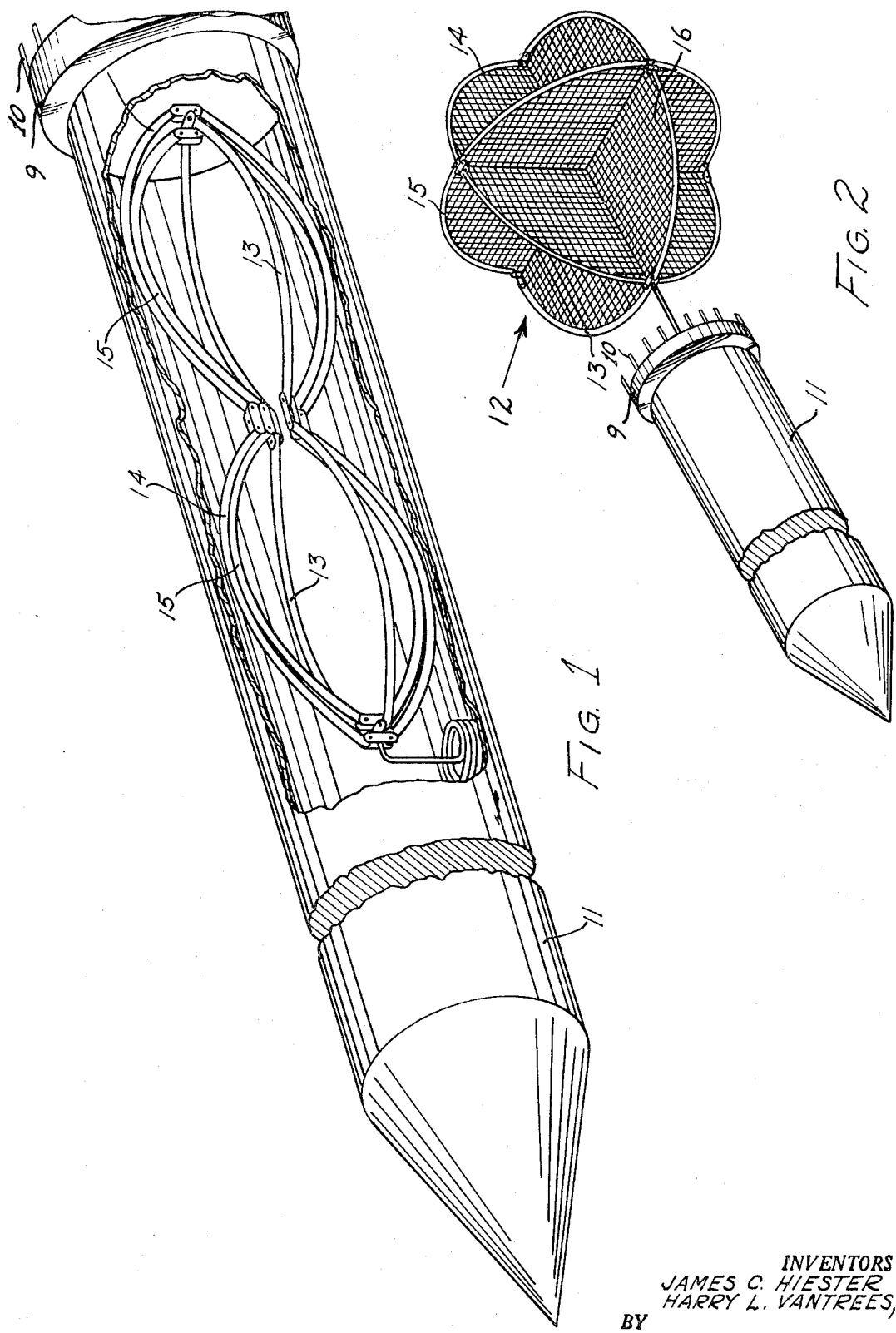

METHOD FOR DEFENDING AN AIRCRAFT AGAINST A FRONTAL ATTACK

The present invention relates to a device for providing forward hemisphere defense for military aircraft against enemy interceptors that might be equipped with either guns, rockets, or air-to-air missiles. The device will also provide protection for an aircraft against surface to air missiles.

Various methods have been employed in the past to guard a military aircraft, such as a bomber, against enemy attack from the front or forward hemisphere. One method consists of the use of electronic countermeasure equipment to jam or deceive the guidance or locating equipment of the enemy interceptor. However, it is highly probable that many enemy interceptors are being equipped with antijam equipment, and electronic countermeasure devices cannot be relied upon to give complete protection.

Another method of defending a military aircraft against a frontal attack has been by the use of forward firing turrets. However, forward firing turrets cannot be readily located in present day high speed aircraft so that the turret will have access to the interceptor.

The present invention provides a novel method of protecting a military aircraft from a frontal attack by providing another target to attract the interceptor. A rocket is launched from the military aircraft to be protected, and upon launching, a corner reflector is ejected from the rocket and towed behind the rocket. The rocket accelerates at approximately 100 feet per second until the rocket is approximately 1000 feet in front of the military aircraft and then the rocket maintains a velocity of about 1000 feet per second until its fuel is exhausted. The towed target consists of three orthogonal surfaces of wire mesh that provides a reflecting surface that will attract the interceptor.

It is therefore a general object of the present invention to provide an improved method and apparatus for defending a military aircraft against a frontal attack.

Another object of the present invention is to provide an improved target for attracting an interceptor away from a military aircraft.

Other objects and advantages of the present invention will be readily appreciated as the same becomes better understood by reference to the following detailed description when considered in connection with the accompanying drawing in which:

FIG. 1 is a side view, partially in section, showing a tow-target folded within a rocket; and FIG. 2 is a perspective view showing a target being towed behind a rocket.

Referring now to the drawing, a rocket 11, which is provided with a suitable engine 9 having a plurality of ports 10, is mounted to an aircraft in a manner such that it will be launched ahead of the aircraft. A tow-target 12 is provided which will fold up and be carried within the rocket 11 during transport by the military aircraft.

Tow-target 12 is comprised of three orthogonal surfaces which are bordered by tubular rings 13, 14, and 15. Each of rings 13, 14, and 15 are suitably hinged so that they can be folded to a relatively small size in order to fit within rocket 11, as shown in FIG 1 of the drawing. Wire mesh 16 is attached to each of rings 13 14, and 15 to provide a reflecting surface. By making the reflective area equal to or slightly greater than that of the parent aircraft, the probability of preventing a hit of the parent aircraft is relatively high.

In operation, one or more of the rockets with tow-targets therein, are mounted to the aircraft by a conventional pod or launching rack. The time of launching the rocket will depend upon the type of mission employed by an enemy. If the primary threat is a surface-to-air missile, the optimum time for launching will be during tracking by an enemy radar in order to cause the attacking system to lock onto the rocket.

When the attack is from an air-to-air missile in the forward hemisphere, the rocket can be launched during any phase of the attack in order to cause the enemy missile to break lock on the parent aircraft and track the rocket. For a direct nose-on, air-to-air missile attack, the rocket will cause the fuse in the missile to detonate prematurely.

As soon as the rocket is launched, the corner reflector is ejected and opened to provide a radar target. The corner reflector might be ejected by any well-known means such as by springs or by compressed air. The rocket is accelerated until it is approximately 1000 feet in front of the parent aircraft, and then the rocket maintains a constant velocity of approximately 1000 feet per second until burn-out. The accelerating force may be provided by a solid or liquid propellant motor which is well-known to those skilled in the missile launching art. By way of example, a single engine may be provided which will provide an accelerating force for a given period of time, and then provide a sustaining force for an additional period of time. As the departure from the parent aircraft is not radical, the rocket an target are particularly effective, as velocity discriminating radars do not detect the change and it is highly probably that the towed target will be tracked instead of the parent aircraft.

It can thus be seen that the present invention provides a novel method of preventing the destruction of an aircraft that is being attacked from a forward hemisphere. Obviously many modifications and variations of the present invention are possible in the light of the above teachings. It is therefore to be understood, that within the scope of the appended claims, the invention may be practiced otherwise than as specifically described.

We claim:

1. A method for defending an aircraft against a frontal attack by an interceptor comprising, launching a rocket in the direction of travel of said aircraft, said rocket containing in a collapsed condition a collapsible reflector having three orthogonal surfaces of wire mesh, then ejecting said reflector from said rocket whereupon said reflector is expanded, and then towing said reflector whereby said reflector serves as a target for attracting said interceptor.